United States Patent [19]

Kimura et al.

[11] Patent Number: 5,140,214

[45] Date of Patent: Aug. 18, 1992

[54] VIBRATION WAVE DRIVEN APPARATUS

[75] Inventors: Atsushi Kimura; Yoshifumi Nishimoto, both of Yokohama; Hiroyuki Seki, Urawa, all of Japan

[73] Assignee: Canon Kabushiki Kaisha, Tokyo, Japan

[21] Appl. No.: 578,229

[22] Filed: Sep. 6, 1990

[30] Foreign Application Priority Data

Sep. 6, 1989 [JP] Japan ................................. 1-230596
Nov. 27, 1989 [JP] Japan ................................. 1-136919

[51] Int. Cl.$^5$ .......................................... H01L 41/08
[52] U.S. Cl. .................................................. 310/323
[58] Field of Search ................................ 310/323, 328

[56] References Cited

U.S. PATENT DOCUMENTS

| | | | |
|---|---|---|---|
| 4,495,432 | 1/1985 | Katsuma et al. | 310/328 |
| 4,562,374 | 12/1985 | Sashida | 310/328 |
| 4,634,916 | 1/1987 | Okada et al. | 310/323 |
| 4,692,650 | 9/1987 | Okumura et al. | 310/323 |
| 4,692,651 | 9/1987 | Hiramatsu et al. | 310/323 |
| 4,752,711 | 6/1988 | Tsukimoto et al. | 310/323 |
| 4,831,305 | 5/1989 | Mukohjima et al. | 310/323 |
| 4,882,500 | 11/1989 | Iijima | 310/323 |
| 4,978,882 | 12/1990 | Kitani | 310/328 |

*Primary Examiner*—Mark O. Budd
*Attorney, Agent, or Firm*—Fitzpatrick, Cella, Harper & Scinto

[57] ABSTRACT

A vibration wave driven motor having a vibratory elastic member provided with an electro-mechanical energy conversion element, and a rail-type stator on which the elastic vibratory member is resiliently pressed by, for example, springs. When A.C. power is supplied to the electro-mechanical energy conversion element, a traveling vibration wave is generated in the elastic vibratory member so that a frictional force is produced to act between the stator and the elastic member so as to cause a relative movement between the elastic vibratory member and the stator. At least one of the sliding surface of the elastic vibratory member and the sliding surface of the stator has a smoothly curved configuration, so as to improve the durability of the motor.

9 Claims, 5 Drawing Sheets

VIBRATION WAVE DRIVEN APPARATUS

BACKGROUND OF THE INVENTION

1. Field of the Invention

The present invention relates to a vibration wave driven apparatus and, more particularly, to a vibration wave driven motor of the type in which an elastic member in which a traveling wave is generated is held in pressure contact with a rail-type stator so that the elastic member is moved along the rail-type stator.

2. Description of the Related Art

FIGS. 6 and 7 show one of known vibration wave driven motors. Referring to these Figures, the vibration wave driven motor has an elongated circular elastic member 1 provided with a projection 1a on its sliding side. A piezoelectric element 2 for generating a traveling vibration wave is joined to the upper side of the elastic member 1. Numeral 8 denotes a rail-type stator which makes frictional contact with the elastic member 1. The elastic member 1 is held in pressure contact with the stator 8 as the elastic member 1 is urged by a pressing spring 3 through an insulating member 5 such as, for example, a felt layer. Numeral 6 denotes a comb-like stopper with teeth 6a thereof received in slits formed in the portion of the elastic member 1 which is not in contact with the rail-type stator 8, so that the elastic member 1 is supported by the teeth 6a through pieces 7 of felt provided in the bottoms of the slits.

The elastic member 1 is carried by a table 4 through the stopper 6, pressurizing spring 3 and so forth. The table 4 is supported by a restriction member 9 which restricts the movement such that the table 4 is movable only in predetermined directions $B_Y$.

When a traveling vibration wave is generated in the elastic member 1 of the described apparatus, the elastic member 1 moves along the rail-type stator 8 so that the table 4 and other members 3, 5, 6 and 7 also move in the direction of the arrow By along the restriction member 9. Meanwhile, the generated frictional drive force acts on a portion of the elastic member 1 which is offset from the supported portion of the elastic member 1, a moment is generated to act on the elastic member 1 to undesirably cause a movement of the elastic member 1 in the directions of arrows $B_X$ and $B_Y$.

As will be seen from FIG. 7, the teeth 6a of the stopper 6 are received in the slits formed in the elastic member 1 so as to restrict the displacement of the elastic member 1 in the direction of the arrow By and to bear the weight of the elastic member 1 through the pieces 7 of felt. The stopper 6 also has restricting portions 6b and 6c which restrict the displacement of the elastic member 1 in the direction of the arrow $B_X$, and a restricting portion 6d which restricts the movement of the pressed portion of the elastic member 1 in the direction of the arrow By.

The elastic member 1 and/or the stator 8 is inevitably deformed due to, for example, a change in temperature. It is therefore extremely difficult to keep a face-to-face contact between the elastic member 1 and the rail-type contact member 8. Actually, therefore, the elastic member 1 contacts with the stator 8 in a slightly inclined state as shown in FIG. 8 or FIG. 9. More specifically, in the state shown in FIG. 8, the elastic member 1 makes a line contact with the rail-type stator 8 at its edge 1b which is often rough due to presence of a burr. On the other hand, in the state shown in FIG. 9, an edge 8a of the rail-type stator 8, which also is rough, makes a line contact with the elastic member 1. In the known vibration wave driven apparatus, therefore, it has been difficult to attain a smooth and stable movement of the elastic member 1 and to obtain a high degree of durability.

SUMMARY OF THE INVENTION

Accordingly, an object of the present invention is to provide a vibration wave driven motor in which the elastic member can stably move without strictly requiring a surface contact between the elastic member and the rail-type stator.

Another object of the present invention is to provide an inexpensive vibration wave driven motor.

These objects are obtained by the provision of a vibration wave driven apparatus that includes a vibration member having a first frictional surface, a contact member having a second frictional surface for contact with the first frictional surface of the vibration member, and an electromechanical conversion member provided on the vibration member for generating a traveling vibration wave in the vibration member, the vibration wave creating relative movement between the vibration member and the contact member, wherein, in a contact region between the first and second frictional surfaces, at least one of the first frictional surface and the second frictional surface has a smoothly curved configuration.

Other objects, features and advantages of the present invention will become the following description of the preferred embodiment when the same is read in conjunction with the accompanying drawings.

DESCRIPTION OF THE PREFERRED EMBODIMENTS

FIGS. 1 to 5 show the first to fifth embodiments of the present invention.

Figure 1:
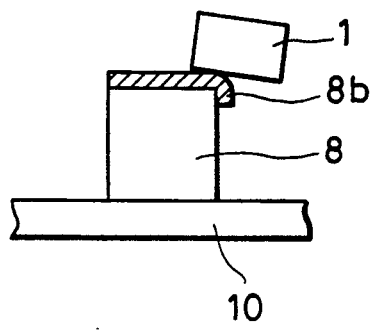
FIGS. 1 to 5 are schematic illustrations the first to fifth embodiments of the present invention.

Referring first to FIG. 1 showing a first embodiment of the present invention, a covering layer 8b of a resin is provided on the surface of a metallic rail-type stator 8 which is opposite to a bottom plate 10 which may serve as a base plate of a printer. The covering layer 8b extends so as to cover the above-mentioned surface of the stator 8 and also the upper end portion of one of the side surfaces of the stator 8. The surface of the covering layer 8b, which is adapted to be contacted by the elastic member 1, is rounded and smoothed so as to provide a curvilinear edge an an obtuse angle, so that the elastic member can stably and smoothly move along the stator 8.

Figure 2:
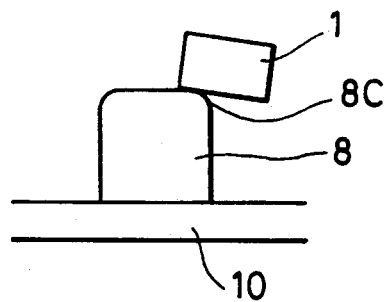

FIG. 2 shows a second embodiment of the present invention. In this embodiment, the edge 8c of cross-section of the rail-type stator 8 is spherically rounded so as to provide a smooth contact between itself and the elastic member 1.

Figure 3:
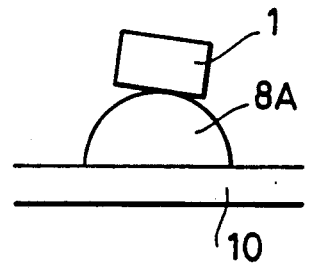

FIG. 3 shows a third embodiment of the present invention in which the rail-type stator 8 has a semi-circular cross-section to provide a smooth contact between itself and the elastic member.

Figure 4:
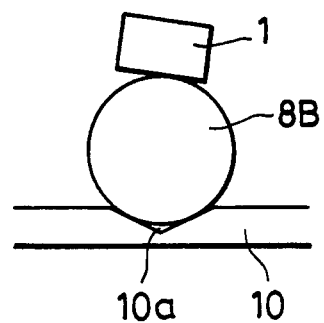

FIG. 4 shows a fourth embodiment in which a rail-type stator 8B of a circular cross-section is received in a V-shaped groove 10a formed in the bottom plate 10.

In the third and fourth embodiments shown in FIGS. 3 and 4, it will be observed that even if the elastic member 1 is inclined opposite to the direction shown in the figures (i.e., its right end is above its left end), the edge of the elastic member 1 will not contact the rail-type stator 8. Thus, the third and fourth embodiments ensure smooth driving of the elastic member 1.

Figure 5:
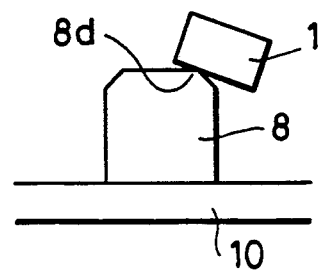

FIG. 5 shows a fifth embodiment in which the corners or edges 8d of the rail-type stator 8 are chamfered to provide a smooth contact between the stator 8 and the elastic member 1 regardless of how the elastic member is deformed.

In the embodiments shown in FIGS. 2 to 5, rail-type stators 8 are integral members made of an elastic material or a resin. This, however, is not exclusive and the rail-type stator 8 in each of these embodiments may be made from an elastic material with a covering layer of a resin formed thereon so as to make a smooth sliding contact with the elastic member 1.

In the first to fifth embodiments described hereinbefore, the surface roughness of the rail-type stator is reduced by smoothing or chamfering at least the portion of the stator contactable with the elastic member, so that the elastic member can be moved stably without precise surface contact between the elastic member and the rail-type stator, i.e., even when the elastic member is inclined with respect to the rail-type stator 8.

Figure 6:
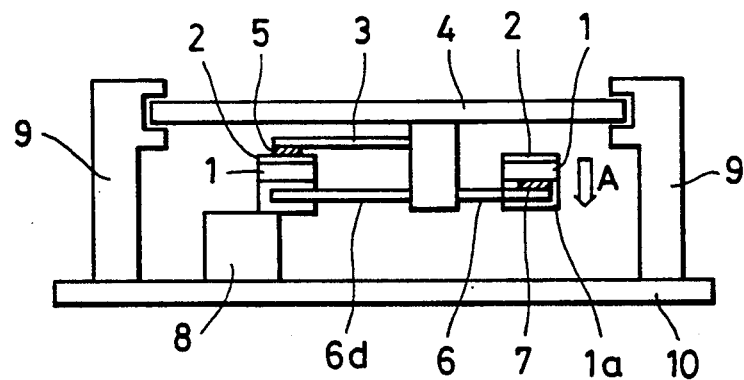
FIGS. 6 and 7 are a side elevational view and a plan view of conventional vibration wave driven motor.
Figure 7:
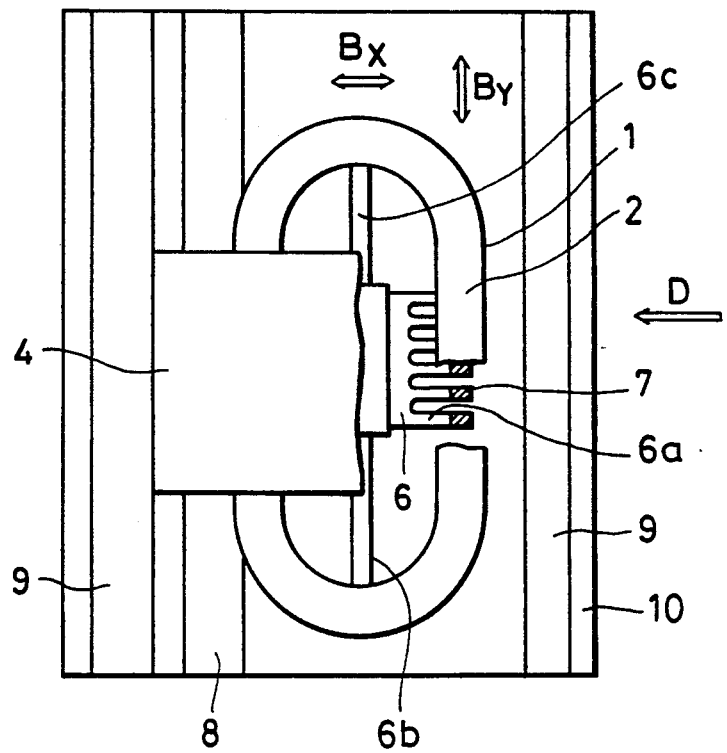
Figure 8:
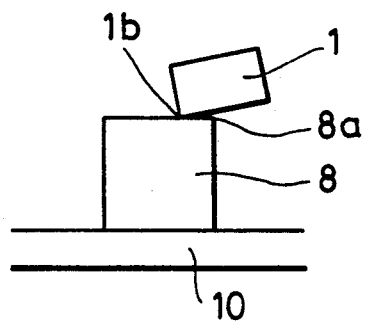
FIGS. 8 and 9 are schematic illustrations of critical portions of a known vibration wave driven motor.
Figure 9:
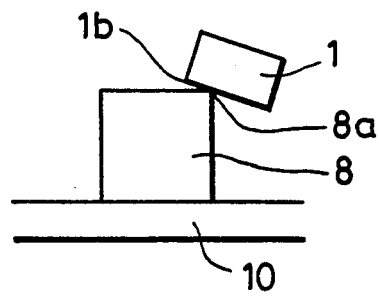

A description will now be given of embodiments in which the smooth movement of the elastic member 1 is attained by smoothing the sliding surface of the elastic member 1, in contrast to the first to fifth embodiments in which smooth sliding contact is attained by specific configuration or arrangement of the rail-type stator 8. These embodiments, like the embodiments shown in FIGS. 1 to 5, include a piezoelectric element, spring, comb-like stopper, felt supports, table and restriction member, all of the type shown in FIGS. 6 and 7, although these elements are not depicted in the interests of clarity.

Figure 10:
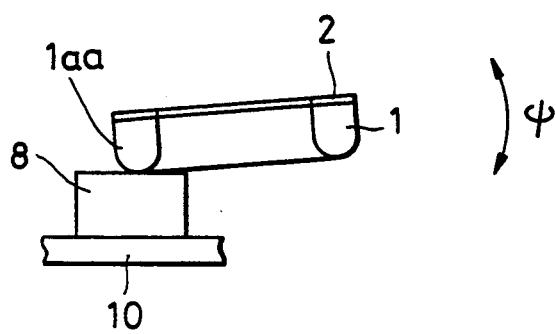
FIG. 10 is a schematic illustration of a portion of a linear motor apparatus embodying the present invention.

In an embodiment shown in FIG. 10, the sliding portion 1aa of the elastic member 1 contacting a rail-type stator 8 has an arcuate cross-section. When a two-phase high-frequency electric field composed of two components of different phases is applied by a driving power supply (not shown) to a piezoelectric element 2 joined to the elastic member 1, a traveling vibration wave is generated in the elastic member 1 so that a frictional force is generated between the rail-type stator 8 and the elastic member so as to act in the direction counter to the direction of travel of the traveling wave, so that the elastic member 1 is moved by a reaction force linearly along the rail-type stator 8 together with a stopper of the type shown in FIG. 6 and a table also of the type shown in FIG. 6.

The elastic member 1 may be situated at an inclination $\Psi$ due to an error in the production of a restriction member 9 (see FIG. 6) or an error in the production of the elastic member 1. In the embodiment shown in FIG. 10, however, a line contact is obtained between the elastic member 1 and the rail-type stator 8 by virtue of the arcuate cross-section of the sliding portion 1aa of the elastic member 1. Thus, a stable state contact is obtained between the elastic member 1 and the rail-type stator 8, whereby the motor output is stabilized.

Figure 11:
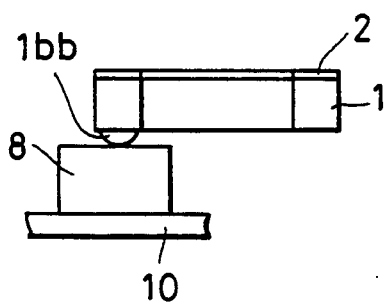
FIGS. 11 to 13 and FIG. 14 are schematic illustrations of different embodiments.
Figure 12:
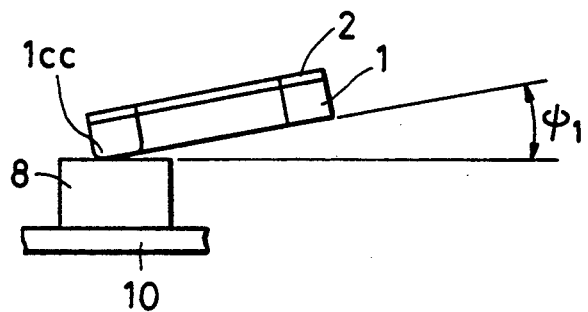
Figure 13:
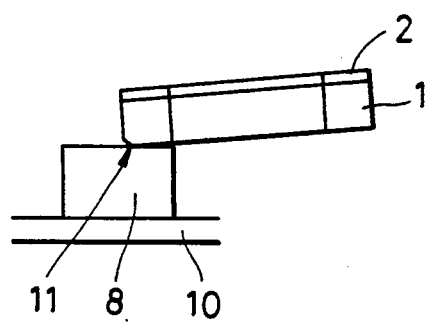
Figure 14:
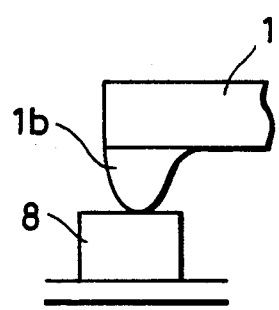

FIGS. 11 to 13 show different embodiments.

Referring to FIG. 11, a projection 1bb having a semi-circular cross-section or a hemispherical form is joined to the sliding portion of the elastic member 1.

In the embodiment shown in FIG. 12, the outer edge portion 1cc of the sliding portion of the elastic member 1 is curved. In general, the amplitude of vibration of the elastic member is greater at its outer peripheral region than the inner peripheral region thereof, regardless of whether the elastic member 1 has a ring-like form or a track-like form. In order to attain a higher speed of operation of the vibration wave driven motor, therefore, it is effective to design the motor such that the outer peripheral edge 1cc of the sliding portion of the elastic member contacts the rail-type stator 8. In the embodiment shown in FIG. 12, a stable contact between the elastic member 1 and the rail-type stator 8 is obtained when the inclination angle $\Psi_1$ falls within the range which meets the condition of $0° < \Psi_1 < 90°$.

Referring to FIG. 13, the outer edge 11 of the elastic member 1 is chamfered to provide a smooth contact between the elastic member 1 and the rail-type stator 8.

In the embodiment shown in FIG. 11, the projection 1bb is provided such that its axis coincides with the neutral axis of the elastic member 1. This, however, is not exclusive and the arrangement may be such that the projection 1bb is offset towards the outer edge of the elastic member 1. In this case, it is possible to make full use of the advantage that the velocity of vibration of the elastic member 1 is greatest at the outer edge of the elastic member.

In the embodiments described hereinbefore, the elastic member is moved along the rail which serves as a stator. The arrangement, however, may be such that contact 8 member corresponding to the rail is moved while the elastic member 1 is stationary.

As will be understood from the foregoing description, according to the present invention, at least one of the sliding portion of the rail-type stator and the sliding surface of the elastic member is smoothly shaped so as to provide a smooth relative sliding movement between the elastic member and the stator 8, while ensuring improved durability of the apparatus.

What is claimed is:

1. A vibration wave driven apparatus, comprising:
    a vibration member having a first frictional surface;
    a contact member having a second frictional surface for contact with said first frictional surface of said vibration member; and
    an electro-mechanical conversion member provided on said vibration member for generating a traveling vibration wave in said vibration member, said vibration wave creating relative movement between said vibration member and said contact member;
    wherein one of said vibration member and said contact member has an edge line formed by a first surface and a second surface, each of said first and second surfaces being parallel to the direction of relative movement, said edge line being parallel to the direction of relative movement, having a smoothly curved configuration and forming said respective first or second frictional surface, the other respective frictional surface being in contact with the edge line.

2. A vibration wave driven apparatus according to claim 1, further comprising a supporting member contacting said vibration member so as to movably support said vibration member.

3. A vibration wave driven apparatus according to claim 2, wherein said contact member is fixed at a predetermined position.

4. A vibration wave driven apparatus comprising:
a vibration member having a first frictional surface;
a contact member having a second frictional surface for contact with said first frictional surface of said vibration member; and
an electro-mechanical conversion member provided on said vibration member for generating a traveling vibration wave in said vibration member, said vibration wave creating relative movement between said vibration member and said contact member;
wherein said contact member has a rectangular cross-section, and said second frictional surface of said contact member is provided on a chamfered edge of said contact member, said edge being parallel to the direction of relative movement.

5. A vibration wave driven apparatus according to claim 1, wherein at least one of said first and second frictional surfaces is coated with a resin.

6. A vibration wave driven apparatus, comprising:
a vibration member having a first frictional surface;
a contact member having a second frictional surface for contact with said first frictional surface of said vibration member; and
an electro-mechanical conversion member provided on said vibration member for generating a driving vibration in said vibration member, said vibration creating a relative movement between said vibration member and said contact member;
wherein one of said vibration member and said contact member has an edge line formed by a first surface and a second surface, each of said first and second surfaces being parallel to the direction of relative movement, said edge line being parallel to the direction of relative movement, having a smoothly curved configuration and forming said respective first or second frictional surface, the other respective frictional surface being in contact with the edge line.

7. A vibration wave driven printer, comprising:
a vibration member having a first frictional surface;
a base plate for the printer;
a contact member having a second frictional surface contactable with said first frictional surface of said vibration member and fixed to the base plate; and
an electro-mechanical conversion member provided on said vibration member for generating a traveling vibration wave in said vibration member, said vibration wave creating a relative movement between said vibration member and said contact member;
wherein one of said vibration member and said contact member has an edge line formed by a first surface and a second surface, each of said first and second surfaces being parallel to the direction of relative movement, said edge line being parallel to the direction of relative movement, having a smoothly curved configuration and forming said respective first or second frictional surface, the other respective frictional surface being in contact with the edge line.

8. A vibration wave driven printer, comprising:
a vibration member having a first frictional surface;
a base plate for the printer;
a contact member having a second frictional surface contactable with said frictional surface of said vibration member and fixed to the base plate; and
an electro-mechanical conversion member provided on said vibration member for generating a driving vibration in said vibration member, said vibration creating a relative movement between said vibration member and said contact member;
wherein one of said vibration member and said contact member has an edge line formed by a first surface and a second surface, each of said first and second surfaces being parallel to the direction of relative movement, said edge line being parallel to the direction of relative movement, having a smoothly curved configuration and forming said respective first or second frictional surface, the other respective frictional surface being in contact with the edge line.

9. A vibration wave driven apparatus, comprising:
a vibration member having a first frictional surface for generating a traveling vibration wave in response to an applied electrical signal; and
a contact member having a second frictional surface for contact with said first frictional surface of said vibration member, said vibration wave generating relative movement between said vibration member and said contact member;
wherein one of said vibration member and said contact member has an edge line formed by a first surface and a second surface, each of said first and second surfaces being parallel to the direction of relative movement, said edge line being parallel to the direction of relative movement, having a smoothly curved configuration and forming said respective first or second frictional surface, the other respective frictional surface being in contact with the edge line.

* * * * *

UNITED STATES PATENT AND TRADEMARK OFFICE
CERTIFICATE OF CORRECTION

PATENT NO. : 5,140,214
DATED : August 18, 1992
INVENTOR(S) : Kimura et al.

It is certified that error appears in the above-identified patent and that said Letters Patent is hereby corrected as shown below:

COLUMN 1

Line 58, "to,for" should read --to, for--.

COLUMN 2

Line 29, "become" should read --become apparent from--.

Line 34, "illustrations" should read --illustrations of--.

Line 61, "an an" should read --at an--.

COLUMN 3

Line 2, "stator 8" should read --stator 8A--.

UNITED STATES PATENT AND TRADEMARK OFFICE
CERTIFICATE OF CORRECTION

PATENT NO.  : 5,140,214
DATED       : August 18, 1992
INVENTOR(S) : Kimura et al.

It is certified that error appears in the above-identified patent and that said Letters Patent is hereby corrected as shown below:

COLUMN 4

Line 38, "contact 8 member" should read --contact member 8--.

Signed and Sealed this

Fifth Day of October, 1993

BRUCE LEHMAN

Commissioner of Patents and Trademarks